United States Patent [19]

Matsumoto

[11] Patent Number: 5,239,824
[45] Date of Patent: Aug. 31, 1993

[54] EVAPORATIVE EMISSION CONTROL SYSTEM FOR INTERNAL COMBUSTION ENGINES

[75] Inventor: Seiji Matsumoto, Wako, Japan

[73] Assignee: Honda Giken Kogyo Kabushiki Kaisha, Tokyo, Japan

[21] Appl. No.: 940,407

[22] Filed: Sep. 3, 1992

[30] Foreign Application Priority Data

Sep. 5, 1991 [JP] Japan ............................. 3-079998[U]

[51] Int. Cl.⁵ ......................... F01N 3/30; F02M 33/02
[52] U.S. Cl. ....................................... 60/283; 60/290; 60/293; 123/520
[58] Field of Search .................... 60/283, 290, 293; 123/518, 519, 520

[56] References Cited

U.S. PATENT DOCUMENTS 3,618,314  11/1971  Krebs ................................. 60/297
4,467,769   8/1984  Matsumura ...................... 123/520
5,176,123   1/1993  Hosoda ............................ 123/520

FOREIGN PATENT DOCUMENTS 58-143  4/1984  Japan ..................................... 60/283

Primary Examiner—Douglas Hart
Attorney, Agent, or Firm—Nikaido, Marmelstein, Murray & Oram

[57] ABSTRACT

An evaporative emission control system for an internal combustion engine having an exhaust passage, an exhaust secondary air supply system connected to the exhaust passage for supplying secondary air thereto, has an ECU which detects an amount of evaporative fuel generated in a fuel tank, e.g., from an output from a tank internal pressure sensor which detects pressure within the fuel tank. An evaporative fuel passage connects between the fuel tank and the secondary air supply means. A control valve is arranged across the evaporative fuel passage for controlling an amount of the evaporative fuel flowing the evaporative fuel passage. The ECU is responsive to an output from the tank internal pressure sensor for causing the control valve to open when the amount of the evaporative fuel exceeds a predetermined value.

4 Claims, 4 Drawing Sheets

EVAPORATIVE EMISSION CONTROL SYSTEM FOR INTERNAL COMBUSTION ENGINES

BACKGROUND OF THE INVENTION

1. Field of the Invention

This invention relates to an evaporative emission control system for internal combustion engines, which operates to prevent evaporative fuel from being emitted from a fuel supply system of the engine, and more particularly to an evaporative emission control system for an internal combustion engine which is equipped with a so-called exhaust secondary air supply system.

2. Prior Art

Conventionally, internal combustion engines equipped with a so-called exhaust secondary air supply system are well known, which system supplies secondary air into an exhaust pipe of the engine in which is provided a catalyst typically represented by a three-way catalyst. The exhaust secondary air supply system supplies secondary air into the exhaust pipe at a zone upstream of the catalyst when the air-fuel ratio of a mixture supplied to the engine is rich with respect to a stoichiometric air-fuel ratio so that exhaust gases are burned at the stoichiometric air-fuel ratio to thereby obtain the best conversion efficiency of the catalyst.

On the other hand, evaporative emission control systems are generally employed in internal combustion engines. One of such evaporative emission control systems is shown in FIG. 1, which comprises a fuel tank 51, a canister in which evaporative fuel is adsorbed and stored, an evaporative fuel passage 53 connecting between the fuel tank 51 and the canister 52, and a two-way valve 54 arranged across the evaporative fuel passage 53.

With this arrangement, when the pressure of evaporative fuel generated in the fuel tank 51 reaches a predetermined level, the evaporative fuel forcibly opens a positive pressure valve of the two-way valve 54 to flow therethrough into the canister 52 where it is adsorbed by an adsorbent 55 and thus stored therein.

During rotation of the engine, vacuum developed in an intake pipe, not shown, causes evaporative fuel to be drawn from the canister 52 together with fresh air introduced into the canister 52 through an air inlet 56, into a purging pipe 57 to be supplied to engine cylinders, not shown, through the intake pipe.

When the fuel tank 51 is cooled due to ambient temperature etc. so that negative pressure increases within the fuel tank 51, a negative pressure valve of the two-way valve 54 is opened to return evaporative fuel stored in the canister 52 into the fuel tank 51. In this manner, the two-way valve 54 regulates the pressure within the fuel tank 51 at a constant level to thereby prevent evaporative fuel generated in the fuel tank 51 from being emitted into the atmosphere.

However, in the evaporative emission control system constructed as above, when evaporative fuel is generated in large quantities within the fuel tank 51, the amount of evaporative fuel adsorbed by the adsorbent 55 within the canister 52 increases correspondingly, and sometimes the adsorbent 55 can be saturated with evaporative fuel adsorbed therein. This can cause deterioration of the adsorbent 55, and even cause evaporative fuel from the fuel tank 51 to pass through the canister 52 into the atmosphere without being adsorbed by the adsorbent 55, resulting in contamination of the atmosphere.

If the purging amount of evaporative fuel is increased by a purging control system, not shown, in order to prevent the above inconveniences, a large amount of evaporative fuel is supplied to the engine cylinders, resulting in fluctuations in the air-fuel ratio of a mixture supplied to the engine and hence degraded exhaust emission characteristics as well as degraded driveability.

SUMMARY OF THE INVENTION

It is the object of the invention to provide an evaporative emission control system for an internal combustion engine equipped with an exhaust secondary air supply system, which is capable of preventing degradation in exhaust emission characteristics and driveability when evaporative fuel is generated in large quantities within the fuel tank, by utilizing the exhaust secondary air supply system.

To attain the above object, the present invention provides an evaporative emission control system for an internal combustion engine having an exhaust passage, secondary air supply means connected to the exhaust passage for supplying secondary air thereto, and a fuel tank, comprising:

detecting means for detecting an amount of evaporative fuel generated in the fuel tank;

an evaporative fuel passage connecting between the fuel tank and the secondary air supply means;

control valve means arranged across the evaporative fuel passage for controlling an amount of the evaporative fuel flowing said evaporative fuel passage; and valve control means responsive to an output from the detecting means for causing the control valve means to open when the amount of the evaporative fuel detected by the detecting means exceeds a predetermined value.

Preferably, the detecting means comprises tank internal pressure detecting means for detecting pressure within the fuel tank.

Alternatively, the detecting means comprises fuel temperature detecting means for detecting temperature of fuel within or from the fuel tank or evaporative fuel concentration detecting means for detecting concentration of the evaporative fuel.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
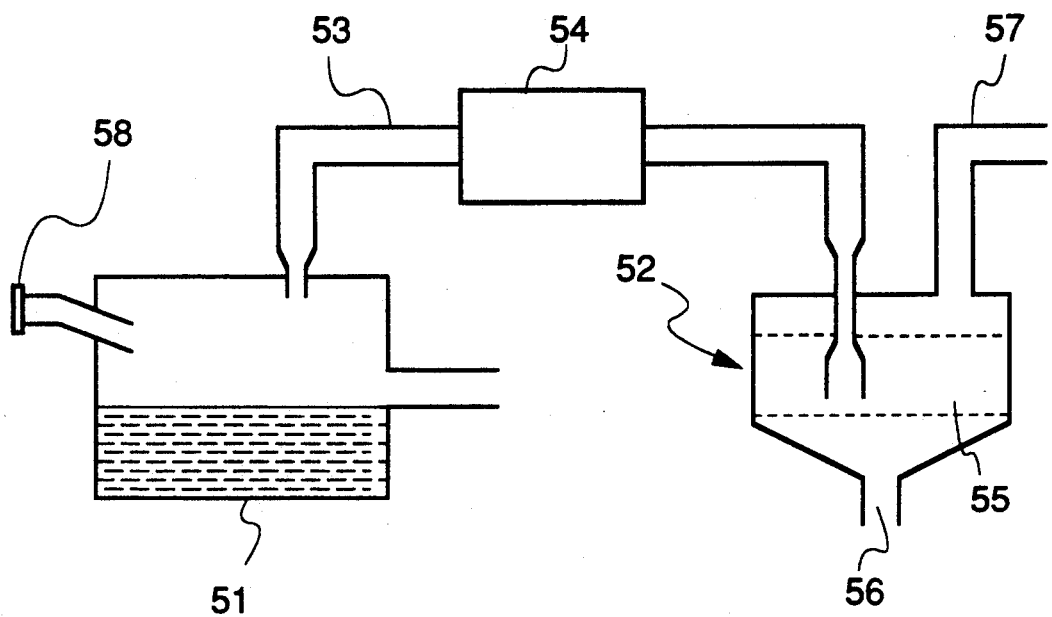
FIG. 1 is a schematic view showing the arrangement of a conventional evaporative emission control system.
Figure 2:
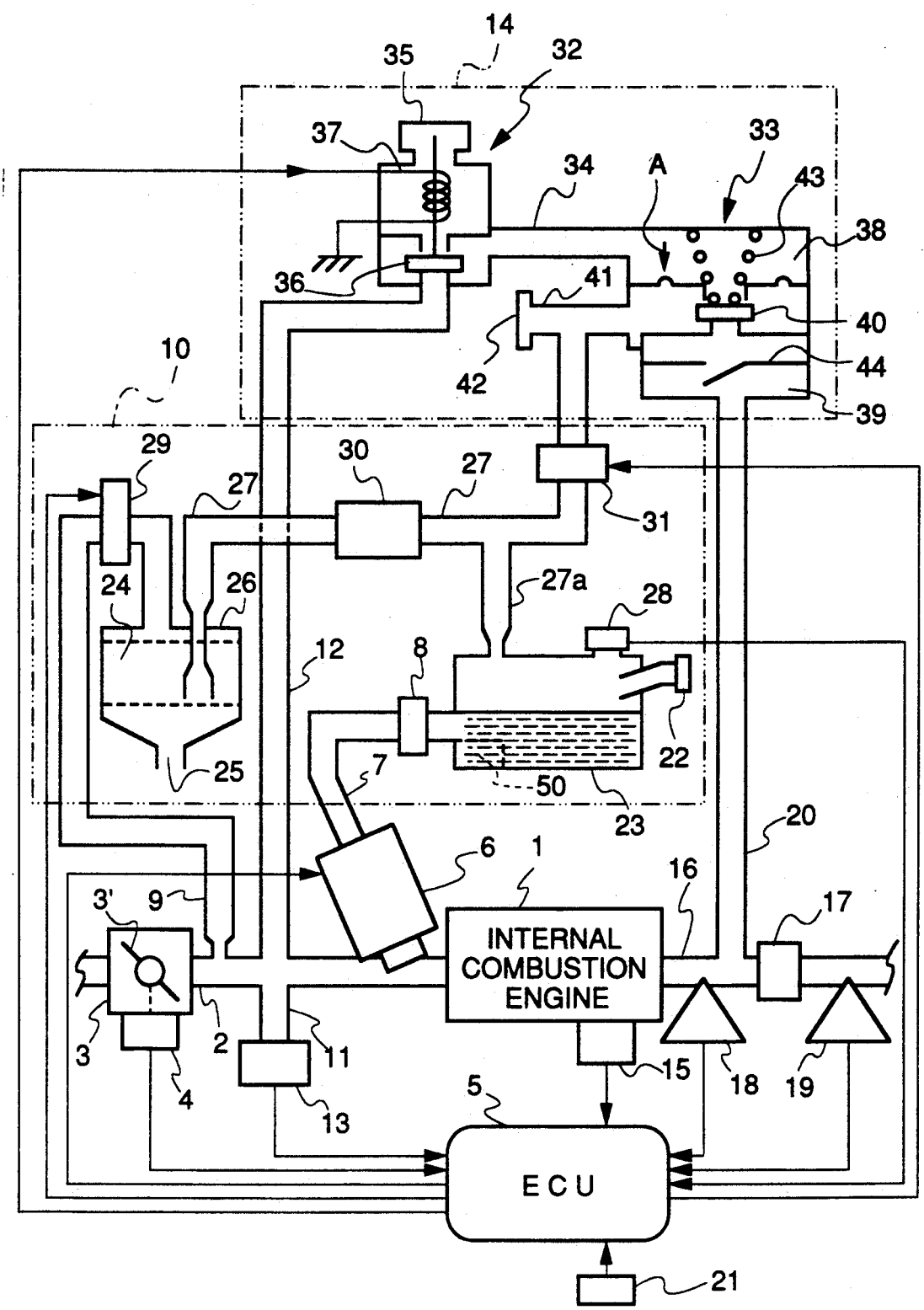
FIG. 2 is a block diagram showing the whole arrangement of an evaporative emission control system according to an embodiment of the present invention.

Referring first to FIG. 1, there is illustrated the whole arrangement of an evaporative emission control system of an internal combustion engine, according to an embodiment of the invention. In the figure, reference numeral 1 designates an internal combustion engine for automotive vehicles. The engine is a four-cylinder type, for instance. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying the same to an electronic control unit (hereinafter called "the ECU") 5.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump 8 via a fuel supply passage 7, and electrically connected to the ECU 5 to have their valve opening periods controlled by signals therefrom.

A purging passage 9 extends from the intake pipe 2 at a location downstream of the throttle valve 31 and is connected to an evaporative emission control system 10, hereinafter described. An intake pipe absolute pressure (PBA) sensor 13 is provided in communication with the interior of the intake pipe 2 via a conduit 11 at a location immediately downstream of the throttle valve 3' for supplying an electric signal indicative of the sensed absolute pressure within the intake pipe 2 to the ECU 5.

A vacuum introducing passage 12 extends from the intake pipe 2 at a location downstream of an end of the purging passage 9 opening into the intake pipe 2 and is connected to an exhaust secondary air supply system 14, hereinafter described.

An engine rotational speed (NE) sensor 15 is arranged in facing relation to a camshaft or a crankshaft of the engine 1, not shown. The engine rotational speed sensor 12 generates a pulse as a TDC signal pulse at each of predetermined crank angles whenever the crankshaft rotates through 180 degrees, the pulse being supplied to the ECU 5.

A three-way catalyst 17 as a catalyst is arranged across an exhaust pipe 16 extending from the cylinder block of the engine 1, for purifying noxious components in exhaust gases emitted from the engine 1, such as HC, CO, and NOx.

First and second $O_2$ sensors 18 and 19 as oxygen concentration sensors are mounted in the exhaust pipe 16 at locations upstream and downstream of the three-way catalyst 17, respectively, for sensing the concentration of oxygen present in the exhaust gases and supplying respective electric signals indicative of the detected values of the oxygen concentration to the ECU 5.

A secondary air supply passage 20 extends from the exhaust pipe 16 at a location downstream of the first $O_2$ sensor 18 and upstream of the catalyst 17 and is connected to the exhaust secondary air supply system 14.

An ignition switch (IGSW) sensor 2, senses on/off states of an ignition switch, not shown, of the engine and supplies an electric signal indicative of the sensed on or off state of the ignition switch to the ECU 5.

The evaporative emission control system 10 is comprised of a fuel tank 23 having a filler cap 22 to be opened for refueling, a canister 26 having an adsorbent 24 formed of activated charcoal, and an air inlet 25, and an evaporative fuel passage 27 extending between the canister 26 and the secondary air supply system 14 and connected to the fuel tank 23 via a branch conduit 27a. A tank internal pressure (PT) sensor 28 is mounted on an upper wall of the fuel tank 23, for sensing the pressure within the fuel tank 23 and supplying the resulting electric signal to the ECU 5.

The canister 26 is connected to the intake pipe 2 through the purging pasage 9. A purge control valve 29 is arranged across the purging passage 9 to control the flow rate of evaporative fuel flowing in the passage 9. The purge control valve 29 is electrically connected to the ECU 5 to have its operation controlled by a signal therefrom.

A two-way valve 30 formed of a positive pressure valve and a negative pressure valve is arranged across the evaporative fuel passage 27 at a location intermediate between the fuel tank 23 and the canister 27. A control valve 31 is arranged across the evaporative fuel passage 27 at a location intermediate between the fuel tank 23 and the secondary air supply system 14 to control an amount of evaporative fuel flowing in the evaporative fuel passage 27. The control valve 31 is an on-off electromagnetic valve and electrically connected to the ECU 5 to have its operation controlled by a signal therefrom.

The secondary air supply system 14 is comprised of a secondary air control valve 32 connected to the vacuum introducing passage 12, a secondary air supply valve 33 for supplying the atmosphere or fresh air into the exhaust pipe 16 through the secondary air supply passage 20, and a passage communicating between the two valves 33, 32.

The secondary air control valve 32 is a normally closed electromagnetic valve formed of an air inlet 35 for introducing the atmosphere, a valve element 36, and a reed valve solenoid (RVS) 37 electrically connected to the ECU 5 to be energized or deenergized by a signal from the ECU 5 for controlling the valve element 36.

The secondary air supply valve 33 is a diaphragm valve formed of a vacuum chamber 38 communicatable with the vacuum introducing passage 12 through the secondary air control valve 32, an atmosphere chamber 39 communicatable with the air supply passage 20, and a diaphragm valve element 40 defining the chambers 38, 39 at its opposite sides. The secondary air supply valve 33 also has an atmosphere inlet passage 41 with an air cleaner 42, through which fresh air is introduced into the atmosphere chamber 39 when the diaphragm valve element 40 is in an open position. The atmosphere inlet passage 41 is connected at its lateral side wall to the evaporative fuel passage 27 to allow evaporative fuel to be fed into the atmosphere chamber 39. A spring 43 is mounted in the vacuum chamber 38 and urges the diaphragm valve element 40 in its closing direction as indicated by the arrow A. A normally closed reed 44 is mounted in the atmosphere chamber 39, which is opened when vacuum is developed in the exhaust pipe 16 for allowing fresh air (secondary air) to be supplied into the exhaust pipe 16.

The ECU 5 comprises an input circuit having the functions of shaping the waveforms of input signals from various sensors including those mentioned above, shifting the voltage levels of sensor output signals to a predetermined level, converting analog signals from analog-output sensors to digital signals, and so forth, a central processing unit (hereinafter called "the CPU"), which carries out an evaporative emission control program, referred to hereinafter, etc., memory means storing various operational programs which are executed in the CPU and for storing results of calculations therefrom, etc., and an output circuit which outputs driving signals to the fuel injection valves 6, and the purge control valve 29, the control valve 31, and the secondary air control valve 32.

The CPU of the ECU 5 forms valve control means for opening the control valve 31 when the internal pressure PT within the fuel tank 23 sensed by the PT sensor 28 is above a predetermined value. When the control valve 31 is thus in a state opened by the signal from the ECU 5, evaporative fuel is supplied through the secondary air supply system 14 into the exhaust pipe 16 whenever the interior of the exhaust pipe 16 is brought into a vacuum state (i.e. whenever the exhaust valve of the engine 1 is closed), so long as the RVS 37 of the secondary air control valve 32 is energized.

The evaporative emission control system constructed as above operates as follows:

When it is determined from the oxygen concentration sensed by the first $O_2$ sensor 18 that the air-fuel ratio is rich, the ECU 5 supplies a signal to the RVS 37 of the secondary air control valve 32 to energize the same so that the control valve 32 is opened to communicate the vacuum chamber 38 with the vacuum introducing passage 12 through the control valve 32 and the communication passage 34. Accordingly, the diaphragm valve element 40 is opened against the force of the spring 43 to communicate the atmosphere chamber 39 with the atmosphere inlet passage 41. When the interior of the exhaust pipe 16 is brought into a vacuum state, the normally closed reed 44 is opened so that secondary air is supplied through the secondary air supply passage 20 into the exhaust pipe 16 whereby the exhaust gases are burned at a stoichiometric air-fuel ratio and accordingly noxious exhaust components such as HC, CO and NOx are effectively purified by the three-way catalyst 17.

Figure 3:
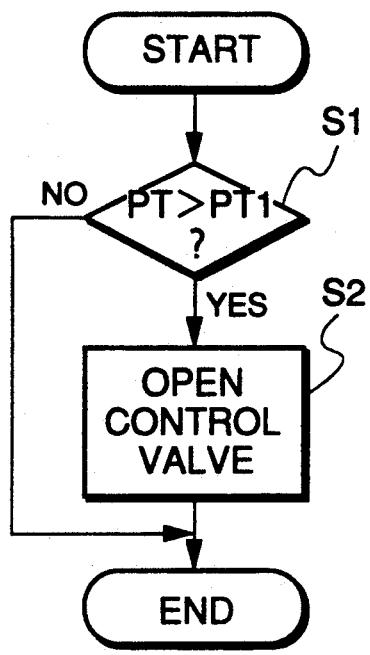
FIG. 3 is a flowchart showing a manner of carrying out evaporative emission control according to the embodiment.

When evaporative fuel is generated in large quantities within the fuel tank 23, that is, when it is determined at a step S1 in FIG. 3 that the tank internal pressure PT sensed by the PT sensor 28 is above the predetermined value PT1, the control valve 31 is opened in response to a signal from the ECU 5 (step S2 in FIG. 3). Then, evaporative fuel generated in the fuel tank 23 is drawn through the evaporative fuel passage 27, the secondary air supply valve 33 and the secondary air supply passage 20 into the exhaust pipe 16 where the evaporative fuel is burned together with the exhaust gases.

By thus supplying evaporative fuel directly into the exhaust pipe 16 instead of supplying the same into the intake pipe 2, not only fluctuations in the air-fuel ratio within the combustion chambers, but also emission of evaporative fuel into the atmosphere can be prevented.

On the other hand, when the tank internal pressure PT is below the predetermined value PT1, evaporative fuel generated in the fuel tank 23 is allowed to flow through the two-way valve 30 into the canister 26 if the positive pressure valve of the two-way valve 30 is open under evaporative fuel pressure exceeding a second predetermined value lower than the predetermined value PT1. During rotation of the engine 1 sensed by the IGSW sensor 21, evaporative fuel stored in the canister 26 is drawn from the canister 26 together with fresh air introduced through the air inlet 25 through the purging passage 9 into the intake pipe 2, at a rate corresponding to the valve opening of the purge control valve 29 which is controlled by a signal from the ECU 5 in response to operating conditions of the engine 1, and then the mixture of evaporative fuel and fresh air is drawn into the combustion chambers of the engine 1.

During stoppage of the engine 1, that is, when the off state of the ignition switch is sensed by the IGSW sensor 21, the amount of evaporative fuel generated in the fuel tank 23 is usually small, and therefore the control valve 31 is closed. On this occasion, the supply and return of evaporative fuel into and from the canister 26 is controlled by the two-way valve 30.

Figure 4:
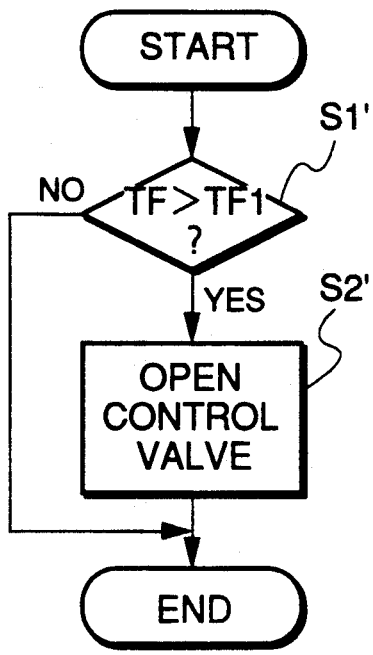
FIG. 4 is a flowchart similar to FIG. 3, showing another embodiment of the invention.

Although in the above described embodiment the amount of evaporative fuel generated in the fuel tank 23 is determined on the basis of an output from the PT sensor 28, it may be determined on the basis of an output from a fuel temperature (TF) sensor 50 formed of a thermistor or the like, which is mounted in the fuel tank 23, as indicated by the broken line in FIG. 1. The fuel temperature TF increases with an increase in the tank internal pressure and decreases with a decrease in the latter. Therefore, the use of the TF sensor may provide similar results to those obtained by the above described embodiment. In this alternative embodiment, when the CPU determines that the fuel temperature TF is above a predetermined value TF 1 (step S1' in FIG. 4), the ECU 5 sends a signal to the control valve 31 to open the same (step S2').

Figure 5:
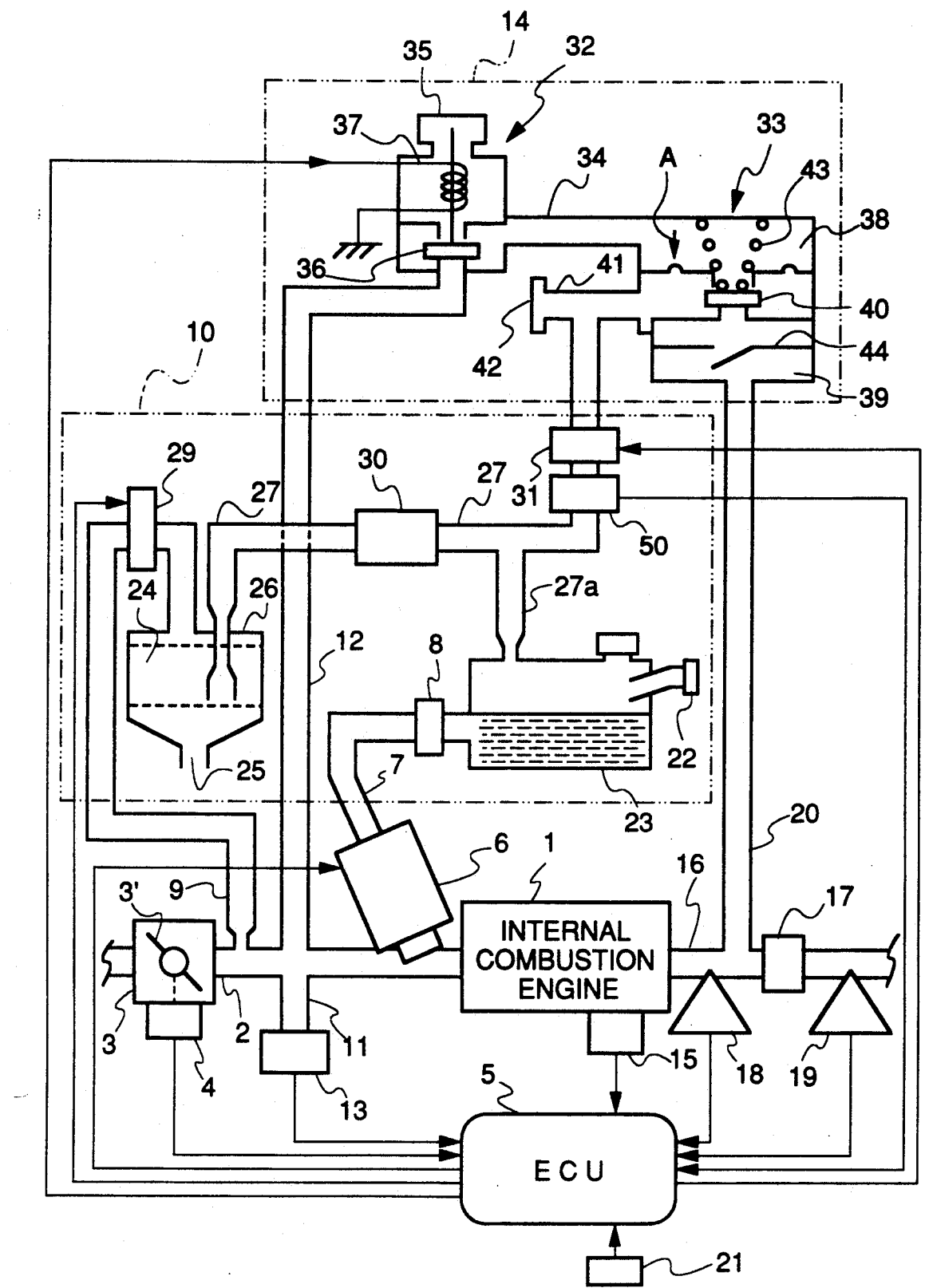
FIG. 5 is a block diagram similar to FIG. 1, according to a further embodiment of the invention.

Further alternatively, as shown in FIG. 5, a vapor concentration (HC) sensor 50 may be arranged across the evaporative fuel passage 27 at a location between the fuel tank 23 and the control valve 31 to sense the concentration (HC) of evaporative fuel (hereinafter referred to as "the vapor concentration") to control the control valve 31 in response to an output from the HC sensor 50. The HC sensor 50 may be formed, e.g., by a hot-wire type mass flowmeter which has an output characteristic variable with a change in the vapor concentration HC. In FIG. 5, corresponding elements and parts to those in FIG. 1 are designated by identical reference numerals. According to this alternative embodiment, the vapor concentration HC is directly detected to more accurately determine the amount of evaporative fuel generated in the fuel tank 23, thereby enabling to achieve more precise evaporative emission control.

Figure 6:
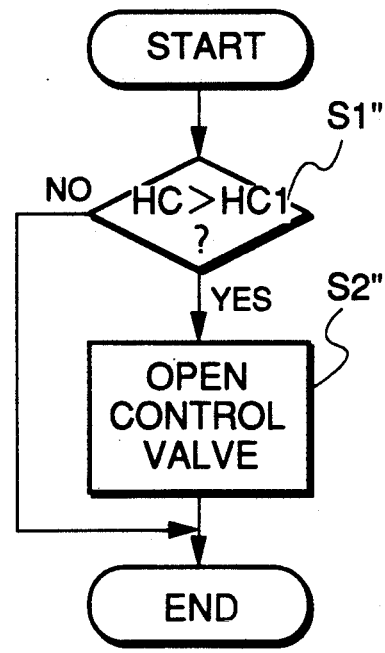
FIG. 6 is a flowchart similar to FIG. 4, showing a manner of carrying out evaporative emission control according to the further embodiment of FIG. 5.

In this embodiment, when the CPU determines that the vapor concentration HC is higher than a predetermined value HC1 (step S1" in FIG. 6), the ECU 5 sends a signal to the control valve 31 to open the same (step S2").

As described above, according to the invention, when the amount of evaporative fuel generated in the fuel tank is above a predetermined value, whenever the interior of the exhaust pipe is brought into a vacuum state, evaporative fuel is supplied through the exhaust secondary air supply system into the exhaust pipe where it burns together with the exhaust gases. Therefore, even when evaporative fuel is generated in large quantities within the fuel tank, emission of evaporative fuel into the atmosphere can be completely prevented. Further, large fluctuations in the air-fuel ratio within the combustion chambers can be prevented to thereby prevent degraded exhaust emission characteristics and secure required drivability.

What is claimed is:

1. An evaporative emission control system for an internal combustion engine having an exhaust passage, secondary air supply means connected to said exhaust passage for supplying secondary air thereto, and a fuel tank, comprising:

detecting means for detecting an amount of evaporative fuel generated in said fuel tank;

an evaporative fuel passage connecting between said fuel tank and said secondary air supply means;

control valve means arranged across said evaporative fuel passage for controlling an amount of said evaporative fuel flowing said evaporative fuel passage; and valve control means responsive to an output from said detecting means for causing said control valve means to open when said amount of said evaporative fuel detected by said detecting means exceeds a predetermined value.

2. An evaporative emission control system as claimed in claim 1, wherein said detecting means comprises tank internal pressure detecting means for detecting pressure within said fuel tank.

3. An evaporative emission control system as claimed in claim 1, wherein said detecting means comprises fuel temperature detecting means for detecting temperature of fuel within or from said fuel tank.

4. An evaporative emission control system as claimed in claim 1, wherein said detecting means comprises evaporative fuel concentration detecting means for detecting concentration of said evaporative fuel.

* * * * *